Sept. 22, 1959  C. S. WEBB  2,905,533
METHOD OF MAKING BASIC IRON SULFATE
Filed Feb. 6, 1957
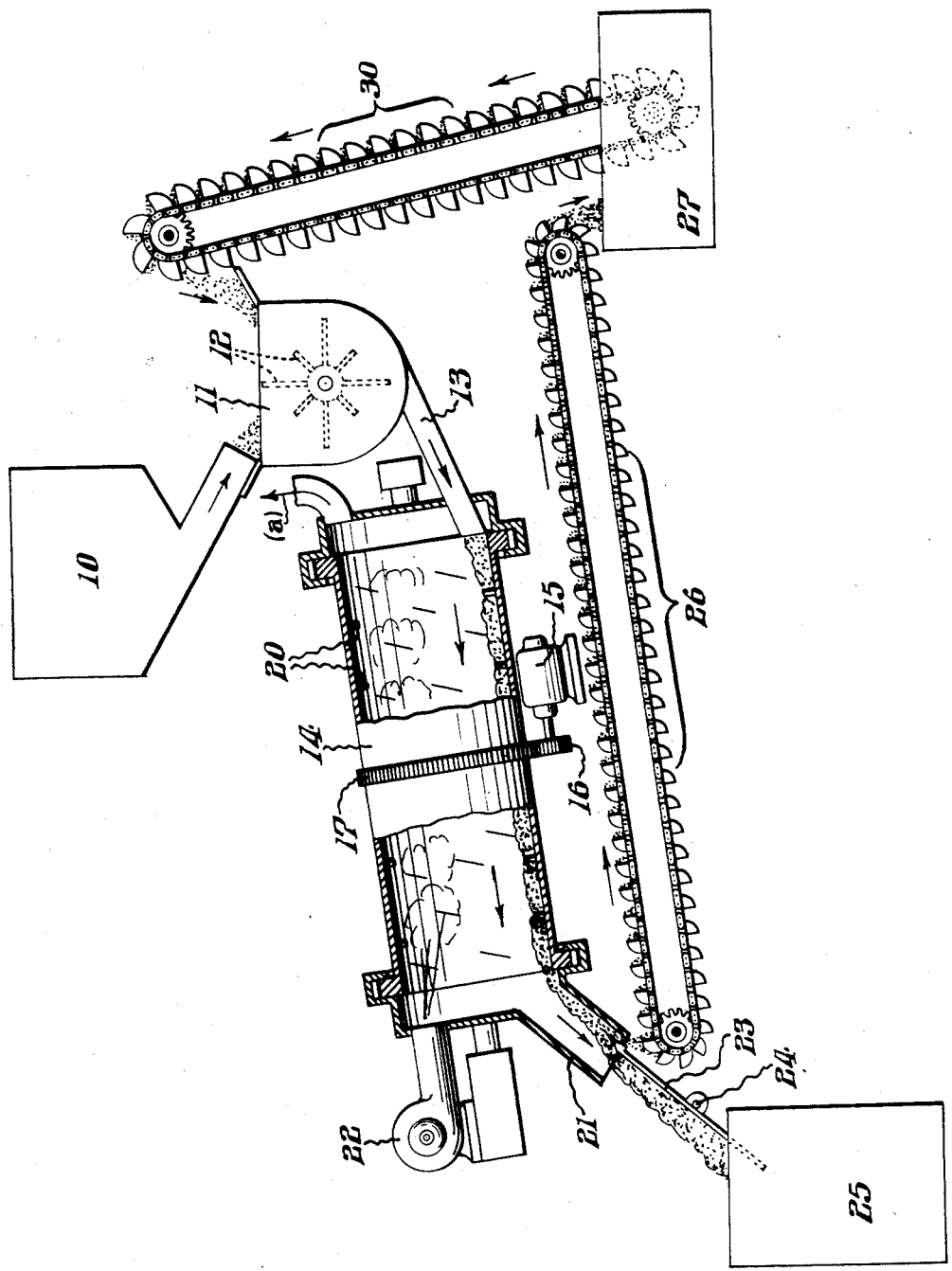
INVENTOR.
Charles S. Webb,
BY Paul & Paul
ATTORNEYS

United States Patent Office 2,905,533
Patented Sept. 22, 1959

2,905,533

METHOD OF MAKING BASIC IRON SULFATE

Charles S. Webb, Palmerton, Pa.

Application February 6, 1957, Serial No. 638,526

1 Claim. (Cl. 23—126)

This invention relates to a method of producing basic ferric sulfate from hydrated ferrous sulfate. More particularly, this invention relates to a process of the type just mentioned which is continuous in nature, utilizing a starting material of small particle size, and producing a product which also consists of a plurality of relatively fine particles.

In accordance with the present invention, ferrous sulfate, the usual commercial product being $FeSO_4 \cdot 7H_2O$, is dehydrated and converted to the ferric state by exposing the same to elevated temperatures in an oxidizing atmosphere. Heretofore, difficulty has been experienced in dehydrating and oxidizing ferrous sulfate in a rotary dryer or the like, because when ferrous sulfate hydrate is brought to an elevated temperature, it tends to dissolve or melt in its own water of crystallization. This effect commences when the ferrous sulfate hydrate is heated to a temperature of about 115° F. or higher, at atmospheric pressure. As a result, a sticky and unmanageable mass is formed which adheres tenaciously to the walls of the furnace or dryer, causing it to accumulate in the form of a ring or the like, quickly building up to such a proportion that the furnace or dryer is rendered inoperative.

It has accordingly been commercially impracticable to dry $FeSO_4 \cdot 7H_2O$ at a temperature of 115° F. or higher, at atmospheric pressure. Moreover, it has been commercially impracticable to carry out an oxidation process at a higher temperature, simultaneously with the dehydration step, because of the tendency of the ferrous sulfate to dissolve in its own water of crystallization.

In the process of the prior art as discussed above, and in other processes wherein ferrous sulfate is oxidized to the ferric state the oxidation reaction has proceeded at a limited rate, and this fact has seriously impeded the production capacity of equipment of any given size. It is accordingly an object of this invention to provide a method of oxidizing ferrous sulfate to the ferric state, wherein the oxidation reaction is much more rapid than heretofore.

It is still another object of this invention to provide a process for dehydrating and oxidizing ferrous sulfate hydrate, which process may be carried out continuously and at a high rate of speed, without accumulation of any adherent substance on the walls of the equipment in which the reaction is carried out.

The foregoing and other objects of this invention, including the simplicity and economy of the same and the ease with which it may be adapted to existing methods and equipment, will further become apparent hereinafter and in the drawing.

The drawing represents a schematic view in side elevation of one particular form of apparatus which is constructed and arranged to carry out the process of this invention.

While the drawing illustrates a preferred manner of carrying out the invention, it will be appreciated that various other forms of apparatus may be used. Moreover, the description which follows is intended to refer to that form of the invention specifically shown in the drawings, for the sake of clarity, and without limiting the scope of the invention.

Turning now to the drawing, the number 10 designates a feed hopper containing hydrated ferrous sulfate, more particularly $FeSO_4 \cdot 7H_2O$. The hydrated ferrous sulfate feed travels downwardly as indicated by the arrow and is discharged into a container 11, which is a mixing container, as will further become apparent. Mixing container 11 has a plurality of paddles 12 which are rotated by the usual drive means, not shown. The mixture from container 11 travels down a chute 13 into the feed end of a rotary kiln 14. Kiln 14 is slowly revolved by a motor 15 operating through a pinion 16 and a large gear 17. Inside the kiln 14 are a plurality of protuberances 20 which lift and then drop the powdery or granular particles within the kiln. The kiln 14 is slightly inclinde so that, as it rotates, the particles slowly gravitate downwardly toward the discharge end, wherein a stationary chute 21 delivers the product from the kiln. A stationary oil burner 22 is mounted adjacent the discharge end of the kiln and directs into the kiln a blast of hot combustion products, including an excess of air or oxygen. This produces an oxidizing atmopshere within the kiln, which is necessary in the practice of this invention. The waste products from the kiln pass upwardly out of a discharge end, as indicated diagrammatically by the arrow A.

Extending within the chute 21 at the discharge end of the kiln is a divider valve 23 which is adjustable on its pivot 24 and which separates the product into two portions. Some product is passed into a storage container 25, while the remainder of the product is dropped onto a continuous conveyor 26 and returned to a collector 27. A lift conveyor 30 extends down into the collector 27 and lifts material upwardly, dropping it into the mixing container 11. In this manner, a portion of the product of the kiln is returned to the mixing collector 11, for admixture with the fresh feed coming from the feed container 10.

The ferrous sulfate hydrate, mixed with ferric sulfate, or basic ferric sulfate, is accordingly fed to the upper end of the kiln and heated by the coolest gases, just before they leave the upper end of the kiln. These gases remove water from the $FeSO_4 \cdot 7H_2O$, and as the mixture passes downwardly through the kiln, the ferrous sulfate hydrate is not only dehydrated but is reacted with the excess oxygen in the stream of hot gases, oxidizing the ferrous iron to the ferric state. The product of the reaction is basic ferric sulfate, most of which is collected but a part of which is returned, as is readily apparent from the drawing.

According to this invention the disadvantages of the prior art are eliminated. The admixture of ferric sulfate with the ferrous sulfate hydrate functions as a deplasticizer and prevents the ferrous uslfate from forming an accumulation which would stick to the walls of the kiln. Moreover, the ferric sulfate acts as a catalyst to promote the oxidation of the ferrous sulfate to ferric sulfate at temperatures above about 115° F. at atmospheric pressure.

The general nature of the reaction which occurs in the kiln is as follows:

$$3FeSO_4 \cdot 7H_2O + Fe_2(SO_4)_3 \cdot Fe(OH)_3 + 3/2 O_2 + \text{Heat}$$
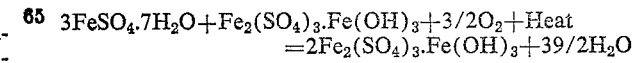
$$= 2Fe_2(SO_4)_3 \cdot Fe(OH)_3 + 39/2 H_2O$$

In the above reaction, 834 lbs. of ferrous sulfate crystals may be mixed with 507 lbs. of ferric sulfate solids of a basic nature. This mixture is heated above 115° F. in an excess-air atmosphere to produce 1014 lbs. of basic ferric sulfate and 351 lbs. of water, given off as steam. The quantity of ferrous sulfate and of ferric sulfate may be varied within wide limits without deleteriously affecting the products of reaction. This variation must be controlled to produce a manageable mass which does not adhere tenaciously to the walls of the kiln causing it to clog up.

When the drying heat applied comes in contact with the ferrous and ferric sulfate mixture, the ferrous sulfate melts in its water of crystallization. This water is taken up by the dry solids of the ferric sulfate so that the plasticity of the mass is decreased to manageability in the drying operation, and at the same time this water reacts with the soluble portion of the ferric sulfate in a hydrolysis type reaction as follows:

$$Fe_2(SO_4)_3 + 6HOH = 3H_2SO_4 + 2Fe(OH)_3$$

The above reaction, which is of a cyclical nature, proceeds as shown because some of the free sulfuric acid liberated in the hydrolysis preferentially oxidizes or catalytically accelerates the oxidation of the ferrous sulfate present in the mass to the ferric condition:

$$2FeSO_4 + H_2SO_4 + \tfrac{1}{2}O_2 = Fe_2(SO_4)_3 + H_2O$$

The water resulting from this action and some of the crystal water in the ferrous sulfate is vaporized and leaves the dryer as the temperature is increased. At the same time the above reactions take place some of the ferrous sulfate is dehydrated and oxidized by the hot excess air to basic ferric sulfate in this manner:

$$4FeSO_4 + O_2 = 2Fe_2O \cdot (SO_4)_2$$

or $$4FeSO_4 + O_2 + 2H_2O = 4Fe.OH.SO_4$$

The formation of basic ferric sulfate from the oxidation of ferrous sulfate by hot atmospheric air and hot liberated sulfuric acid continues to proceed as the temperature of the drying operation increases. Excess water other than that consumed in the reaction is vaporized from the dryer. Consequently under controlled conditions the entire mass is finally discharged from the dryer substantially in the ferric condition.

The control of temperature in accordance with this process, while not critical on an absolute basis, is of importance in obtaining proper results. The low temperature end or charge end of the kiln should be maintained above the melting point of seven mole ferrous sulfate or 147° F., and can be as high as 896° F., the decomposition point of anhydrous ferric sulfate. The hot temperature and or discharge end of the kiln must be maintained above 572° F., the point at which ferrous sulfate gives up all its water of crystallization, but should not exceed 896° F.

The kiln is operated under oxidizing conditions preferably by supplying hot air from the discharge end, but this may be accomplished by other means if desired. The retention time of the material passing through the kiln is controlled by well known methods for this type equipment.

The following example constitutes a preferred manner of carrying out this invention:

*Example*

Ferrous sulfate, $FeSO_4 \cdot 7H_2O$, is mixed with 30% to 60% of its weight of ferric sulfate, and this mixture is subjected to a drying and oxidizing process as described, in a revolving furnace or dryer at a temperature from about 200° F. at the feed end, to about 650° F. at the discharge end. Water vapor and dry excess air escape at the upper or feed end of the furnace or dryer and basic ferric sulfate is discharged from the lower or hot end of the unit. A portion of this basic ferric sulfate, as required, is continuously returned to the feed end of the dryer for mixture with the ferrous sulfate.

In contrast with the methods of the prior art, the presence of water of crystallization of the ferrous sulfate is desirable, because this water is liberated in the presence of heat and comes in contact with the basic ferric sulfate present, thereby preferentially freeing some of the sulfuric acid content from the basic ferric sulfate, which acid in turn aids in the oxidation of the ferrous sulfate to the ferric state. The ferric sulfate reaction is of a cyclical nature and the sulfuric acid has a catalytic effect which continues to promote the conversion of the ferrous sulfate to the ferric state.

Although this invention has been described with reference to specific forms thereof, it will be appreciated that equivalent elements may be substituted for those specifically referred to herein, that certain features of the invention may be utilized without the use of other features, and that various reversals may be made without departing from the spirit and scope of the invention as defined in the appended claim.

Having thus described my invention, I claim:

In a process for dehydrating and oxidizing $FeSO_4 \cdot 7H_2O$ to basic ferric sulfate at a temperature of above about 115° F., the novel steps of catalyzing said oxidation which comprise continuously mixing said $FeSO_4 \cdot 7H_2O$ with about 30% to 60% by weight basic ferric sulfate, continuously feeding said mixture into the upper end of a rotary kiln, said kiln being rotated continuously about its elongated axis and fired at its bottom end such that hot combustion gases sweep upwardly continuously therethrough, lifting and cascading said mixture in said hot combustion gases thereby dehydrating said $FeSO_4 \cdot 7H_2O$ in the presence thereof, and thereby hydrolyzing said basic ferric sulfate, whereby sulfuric acid is liberated, contacting the sulfuric acid with said ferrous sulfate whereby said sulfuric acid catalyzes the oxidation of said $FeSO_4 \cdot 7H_2O$ to basic ferric sulfate, continuously withdrawing the dry basic ferric sulfate product from the lower end of said kiln, continuously withdrawing said hot combustion gases at the upper end of said kiln, and continuously mixing a portion of the dry basic ferric sulfate, in an amount of about 30% to 60% by weight, with additional $FeSO_4 \cdot 7H_2O$ and feeding the resulting mixture into the feed end of said kiln, while drawing off the balance of said dry basic ferric sulfate as product.

References Cited in the file of this patent

UNITED STATES PATENTS

| | | |
|---|---|---|
| 1,316,909 | MacKaye | Sept. 23, 1919 |
| 1,813,649 | Weise | July 7, 1931 |
| 2,143,805 | Smith | Jan. 10, 1939 |

FOREIGN PATENTS

| | | |
|---|---|---|
| 13,946 | Great Britain | 1907 |